(12) United States Patent
Meyers et al.

(10) Patent No.: US 9,180,610 B2
(45) Date of Patent: Nov. 10, 2015

(54) DEVICES AND PROCESSES FOR FABRICATING MULTI-COMPONENT OPTICAL SYSTEMS

(75) Inventors: William E. Meyers, Scottsdale, AZ (US); Hermann H. Neidlinger, San Jose, CA (US)

(73) Assignee: CRT Technology, Inc., Mesa, AZ (US)

( * ) Notice: Subject to any disclaimer, the term of this patent is extended or adjusted under 35 U.S.C. 154(b) by 527 days.

(21) Appl. No.: 13/592,503

(22) Filed: Aug. 23, 2012

(65) Prior Publication Data

US 2014/0054805 A1     Feb. 27, 2014

(51) Int. Cl.
| | |
|---|---|
| *B29C 39/26* | (2006.01) |
| *B29C 39/12* | (2006.01) |
| *B29C 33/00* | (2006.01) |
| *B29C 39/14* | (2006.01) |
| *B29D 11/00* | (2006.01) |
| *B29C 39/00* | (2006.01) |
| *B29C 39/18* | (2006.01) |
| *G02B 9/00* | (2006.01) |
| *B29L 11/00* | (2006.01) |

(52) U.S. Cl.
CPC ............. *B29C 39/12* (2013.01); *B29C 33/0022* (2013.01); *B29C 39/006* (2013.01); *B29C 39/146* (2013.01); *B29C 39/18* (2013.01); *B29C 39/26* (2013.01); *B29D 11/00048* (2013.01); *B29D 11/0048* (2013.01); *B29D 11/00403* (2013.01); *G02B 9/00* (2013.01); *B29L 2011/00* (2013.01)

(58) Field of Classification Search
CPC   B29C 33/0022; B29C 39/146; B29C 39/006; B29C 39/18; B29C 39/26; B29C 39/12; B29D 11/00403; B29D 11/0048; B29L 2011/00; G02B 9/00

USPC ............. 264/1.32, 1.37, 2.5, 2.7; 351/159.01, 351/159.7, 159.73, 159.74, 159.75
See application file for complete search history.

(56) References Cited

U.S. PATENT DOCUMENTS

| | | |
|---|---|---|
| 2,641,161 A | 6/1953 | Silverstein |
| 3,246,941 A | 4/1966 | Moss |
| (Continued) | | |

OTHER PUBLICATIONS

Schaub, M., Schwiegerling, J., & Fest, E., Molded Optics: Design and Manufacture, 2011, Boca Raton: CRC Press, 1st Edition, p. 161.*

(Continued)

*Primary Examiner* — Alison Hindenlang
*Assistant Examiner* — Jerzi H Moreno Hernandez
(74) *Attorney, Agent, or Firm* — Law Offices of Damon L. Boyd, PLLC (57) ABSTRACT

The present disclosure relates to devices and processes for fabricating a multi-component optical system. A device is an integral mold comprising an attachment portion and a cup portion having a cavity, and the mold further comprises a first optical component. The cavity of the mold contains additional optical components to form a multi-component optical system blank. Another device is a multi-component optical system blank. A process for fabricating a multi-component optical system blank comprises providing an integral mold comprising a first optical component, adding at least a second optical component, shaping the mold after addition of an optical component, and shaping the resultant blank into an optical system. A further device is a multi-component optical system produced in a process disclosed herein.

14 Claims, 9 Drawing Sheets

(56) References Cited

U.S. PATENT DOCUMENTS

| | | | |
|---|---|---|---|
| 4,441,795 A * | 4/1984 | Lobdell | 351/159.41 |
| 4,621,912 A | 11/1986 | Meyer | |
| 4,749,530 A | 6/1988 | Kunzler | |
| 4,921,205 A * | 5/1990 | Drew et al. | 249/61 |
| 5,104,213 A | 4/1992 | Wolfson | |
| 5,671,038 A | 9/1997 | Porat | |
| 5,861,114 A * | 1/1999 | Roffman et al. | 264/2.5 |
| 5,972,251 A * | 10/1999 | Shannon | 264/1.7 |
| 6,048,063 A | 4/2000 | Fritsch et al. | |
| 6,071,111 A | 6/2000 | Doke et al. | |
| 6,276,920 B1 * | 8/2001 | Doke et al. | 425/412 |
| 6,409,141 B1 * | 6/2002 | Yamazaki et al. | 249/117 |
| 6,726,322 B2 | 4/2004 | Andino et al. | |
| 6,779,888 B2 | 8/2004 | Marmo | |
| 6,909,554 B2 * | 6/2005 | Liu et al. | 359/626 |
| 7,559,650 B2 | 7/2009 | Iuliano | |
| 7,695,135 B1 | 4/2010 | Rosenthal | |
| 8,082,824 B2 * | 12/2011 | Meyers | 82/1.11 |
| 8,102,599 B2 * | 1/2012 | DeCusatis et al. | 359/620 |
| 8,142,016 B2 | 3/2012 | Legerton et al. | |
| 8,441,731 B2 | 5/2013 | Sprague | |
| 8,482,858 B2 | 7/2013 | Sprague | |
| 8,520,309 B2 | 8/2013 | Sprague | |
| 2006/0290882 A1 | 12/2006 | Meyers et al. | |
| 2007/0036878 A1 * | 2/2007 | Goodenough et al. | 425/542 |
| 2007/0132123 A1 * | 6/2007 | Koscher et al. | 264/1.31 |
| 2007/0232755 A1 * | 10/2007 | Matsushita et al. | 525/209 |
| 2008/0239237 A1 * | 10/2008 | Ansell et al. | 351/160 R |
| 2010/0109176 A1 * | 5/2010 | Davison | 264/2.5 |
| 2010/0149618 A1 | 6/2010 | Sprague | |
| 2010/0265163 A1 | 10/2010 | Legerton et al. | |
| 2011/0096100 A1 | 4/2011 | Sprague | |
| 2012/0120365 A1 | 5/2012 | Legerton et al. | |
| 2012/0147320 A1 | 6/2012 | Legerton et al. | |
| 2012/0169994 A1 * | 7/2012 | Matsushita et al. | 351/159.33 |
| 2014/0042650 A1 * | 2/2014 | Muhle et al. | 264/2.7 |

OTHER PUBLICATIONS

The International Search Report and The Written Opinion of the International Searching Authority for International Application No. PCT/US2013/054116 mailed on Jan. 24, 2014.

Non-Final Office Action dated Aug. 8, 2014 for U.S. Appl. No. 13/980,023.

* cited by examiner

DEVICES AND PROCESSES FOR FABRICATING MULTI-COMPONENT OPTICAL SYSTEMS

FIELD

The present disclosure relates generally to processes and devices for the manufacture of optical systems. More particularly, the disclosure relates to multi-component optical systems and devices and processes for the manufacture thereof from composites comprising two or more optical components.

BACKGROUND

To manufacture hybrid or multi-component optical systems using traditional methods, each component part or shape may need to be manufactured from rods or blanks that are processed by cutting into various shapes using a variety of techniques, for example, lathing or milling, and subsequently assembled by joining the components, for example, by using an adhesive assembly process. This type of assembly process can be problematic, as it may cause optical distortions in the assembled system through formation of optical inhomogeneities (such as bubbles, de-adhesion and retraction, stress birefringence, schlieren, and the like) in the adhesive layers, adhesive imperfections which may cause the assembly to exhibit adhesive failure, alignment problems, and distortions detrimental to the optical performance of the system, to list several examples.

As described above, current processes for manufacturing multi-component optical systems are not commercially attractive due to high rates of adhesive failure and alignment problems that may be detrimental to optical performance. Accordingly, the increasingly stringent optical precision requirements of evolving miniature multi-component optical systems require improved manufacturing processes and devices to facilitate such improved processes.

SUMMARY

In accordance with various embodiments, the ability to produce multi-component optical systems is improved by providing devices and processes for constructing a multi-component optical system, such as an optical system in the form of a contact lens. As set forth in more detail below, the various advantages of the devices and processes of the embodiments disclosed herein include the ability to more accurately configure and locate various optical materials or components used in a multi-component optical system.

In various embodiments, a mold for fabricating a multi-component optical system blank comprises a cup portion and an attachment portion. In accordance with various embodiments, the mold comprises a first optical material that is integral to (i.e., becomes a part of) the blank that the mold is used to produce. In accordance with further aspects, the cup portion comprises a cavity defined by an inner wall of the cup portion. In various embodiments, the mold may further comprise additional optical components, and the cavity of the mold may further comprise additional cavities or compartments.

In accordance with various embodiments, a multi-component optical system blank comprises at least a first optical component and a second optical component. In various embodiments, the first optical component comprises an attachment portion and a cup portion having a cavity defined by an inner wall, and a second optical component of the blank is in the cavity of the first component. In various embodiments, the blank may further comprise additional optical components.

In various embodiments, a multi-component optical system blank fabrication process comprises preparing a multi-component optical system blank mold that will serve as the first component of the optical system from a first optical material, adding a second optical component to the multi-component optical system blank mold, and, optionally, adding additional optical components to the mold. In various embodiments, the process may further optionally comprise a shaping step for each optical component that may be added to the blank.

In various embodiments, a process for fabricating a multi-component optical system blank comprises adding a second optical component to an integral mold made from a first optical material, wherein the mold comprises an attachment portion and a cup portion having a cavity defined by an inner wall, and wherein the second optical component is added in the cavity of the mold. In various embodiments, the process may optionally further comprise adding additional optical components to the cavity of the mold as well as optional shaping steps for each component that may be added to the blank.

In accordance with various embodiments, a multi-component optical system comprising at least two optical components having different properties is produced. In various embodiments, the multi-component optical system is produced by a manufacturing process wherein a first optical component serves as a mold for at least a second optical component. The at least two optical components may be shaped into a multi-component optical system by a material removal step.

BRIEF DESCRIPTION OF THE DRAWINGS

The subject matter of the present disclosure is particularly pointed out and distinctly claimed in the concluding portion of the specification. A more complete understanding of the various embodiments, however, may best be obtained by referring to the detailed description when considered in connection with the drawing figures, wherein:

DETAILED DESCRIPTION

The detailed description of various embodiments herein makes reference to the accompanying drawing figures, which show various embodiments and implementations thereof by way of illustration and best mode, and not of limitation. While these embodiments are described in sufficient detail to enable those skilled in the art to practice the embodiments, it should be understood that other embodiments may be realized and that mechanical and other changes may be made without departing from the spirit and scope of this disclosure. Rather, the following disclosure is intended to teach both the implementation of the various embodiments and any equivalent embodiments. Furthermore, any reference to singular includes plural embodiments, and any reference to more than one component may include a singular embodiment. Moreover, recitation of multiple embodiments having stated features is not intended to exclude other embodiments having additional features or other embodiments incorporating different combinations of the stated features. As used in this disclosure, the term "or" shall be understood to be defined as a logical disjunction (e.g., and/or) and shall not indicate an exclusive disjunction unless expressly indicated.

As set forth in more detail below, various embodiments described herein provide significant advancements over prior art processes, particularly with regard to the ability to consistently produce multi-component optical systems as compared to processes that rely on adhesive assembly. Furthermore, the devices and processes disclosed herein facilitate more accurate configuration and alignment of optical components and the manufacture of multi-component optical systems with a capacity for enhanced optical accuracy and performance. Moreover, existing contact lens manufacturing processes that utilize a machining process to shape buttons to specification, in many instances, may be compatible with the devices provided in the present disclosure and the products of the processes disclosed herein, and therefore capable of realizing the many commercial benefits the present disclosure provides.

In various embodiments, a mold for fabricating a multi-component optical system blank comprises an attachment portion and a cup portion. The cup portion may further comprise an inner wall. The inner wall of the cup portion of the mold may define a first cavity. In various embodiments, the mold comprises a first optical component. In accordance with further aspects, the mold is integral to the blank or, described differently, comprises a constituent of the blank.

Figure 1A:
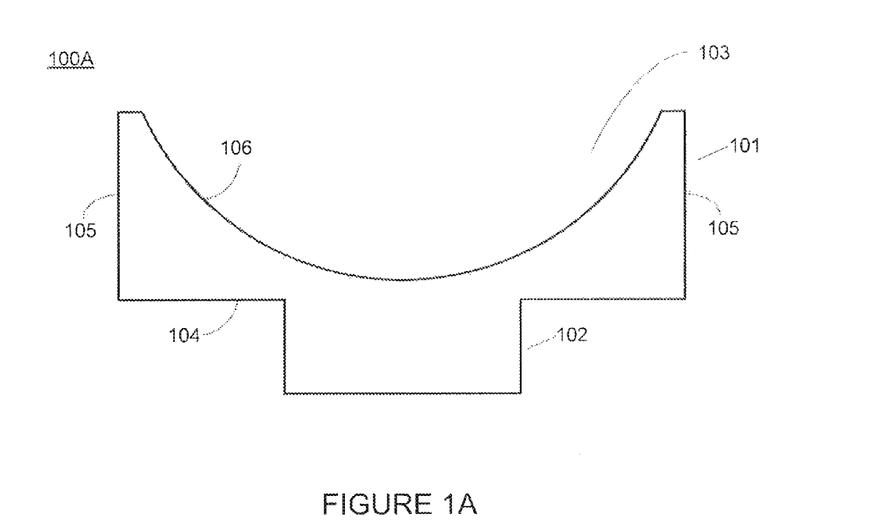
FIG. 1A illustrates a cross section of a multi-component optical system blank mold having a concave inner wall.
Figure 1B:
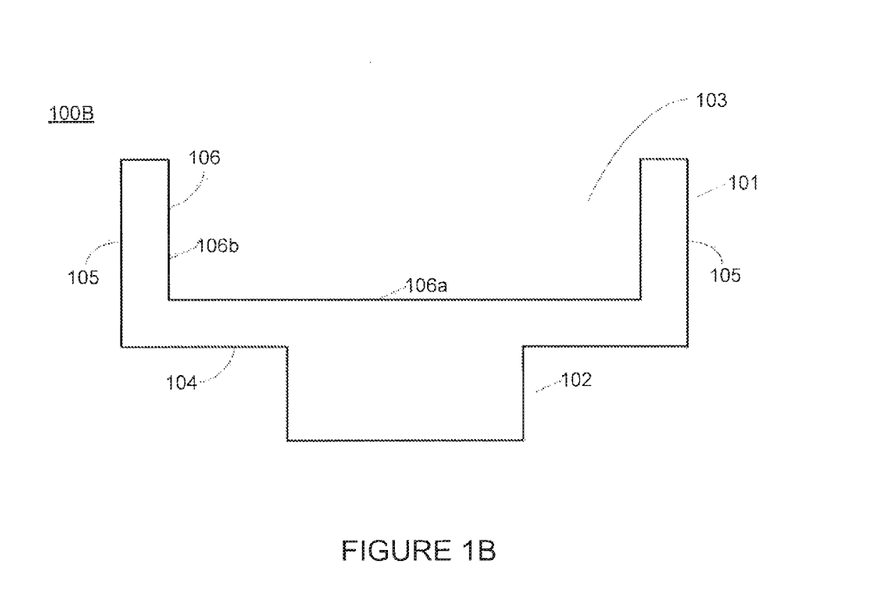
FIG. 1B illustrates a cross section of a multi-component optical system blank mold having an inner wall comprising a bottom surface and an axial surface.

For example, FIGS. 1A-1B illustrate various embodiments of a multi-component optical system blank mold. In accordance with the embodiments, the multi-component optical system blank molds 100A and 100B are comprised of a first optical component which may become part of the optical system blank the mold produces. Explained another way, the mold is integral to the multi-component optical system blank in that the mold is used to form and comprises a part of the blank as well as a part of the multi-component optical system the blank is used to create.

In various embodiments, the mold comprises one or more optical materials. As used herein, the term "optical material" includes, for example, one or more of fluorosilicon acrylate, silicon acrylate, polymethylmethacrylate, a silicon hydrogel, biocompatible materials, transparent materials, and the like, which can be soft or rigid, and which can be suitable for machining on a lathe during fabrication of a button or optical system.

In various embodiments, the mold is shaped or formed to have a cup portion 101 and an attachment portion 102. The cup portion 101 may further be shaped or formed to have a cavity 103 configured to receive additional optical components. The shape and dimension of the cup portion 101 and the cavity 103 may be chosen to accommodate additional fabrication steps. The cup portion may comprise a cylindrical section with at least one surface serving as a reference surface that may be useful as a control plane with respect to which additional features can be oriented and/or located. In various embodiments, the cup portion may have a bottom wall 104 and an axial wall 105. The cavity 103 of cup portion 101 may be defined by an inner wall 106. The inner wall 106 may comprise a single surface, for example, a concave surface that defines cavity 103, as illustrated in FIG. 1A. In other embodiments, cavity 103 may be defined by an inner wall 106 comprising more than one surface, for example, a bottom surface 106a and an axial surface 106b, as illustrated in FIG. 1B. The mold may be radially symmetrical with a circular cross section. In accordance with various embodiments, the mold is not provided with a surface that will comprise an anterior surface of a lens or component of the lens fabricated from the mold.

In various embodiments, attachment portion 102 may be shaped or formed in a manner that allows it to be attached to a lathe, mill, machine, or other device that may be used for further fabrication of the mold. For example, attachment portion 102 may be shaped in a manner that is suitable for attachment in the collet of a lathe. The attachment portion may comprise a cylindrical section with at least one surface serving as a reference surface that may be useful as a control plane with respect to which additional features can be oriented and/or located. The attachment portion of a mold may have any shape or configuration suitable for attachment to any machine or device that may be used for further fabrication of the mold. In accordance with various embodiments, the attachment portion used for further fabrication of the mold is comprised of the first optical component along with the cup portion, and the attachment portion does not comprise a second optical component added to the first optical component. In other embodiments, the attachment portion of a mold may comprise an optical component added to the first optical component of the mold.

In accordance with various embodiments and as described above, a reference surface may be located on the cup portion 101 of the mold or on the attachment portion 102. In yet other embodiments, a mold may have more than one reference surface, and reference surfaces may be variously located on or in the cup portion of the mold as well as on the attachment portion of the mold. In various embodiments, the axis of the mold may also serve as a reference line for controlling the orientation and location of features of the mold during the fabrication process.

Figure 2A:
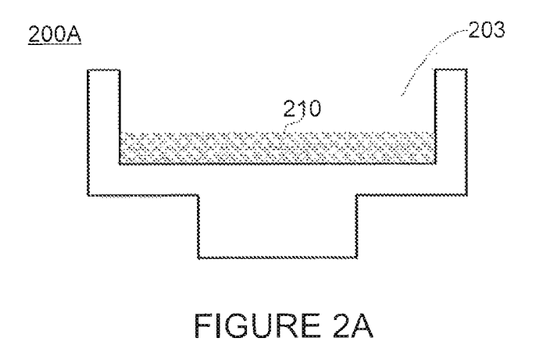
FIG. 2A illustrates a cross section of a multi-component optical system blank mold having a second optical component in the cavity of the mold.
Figure 2B:
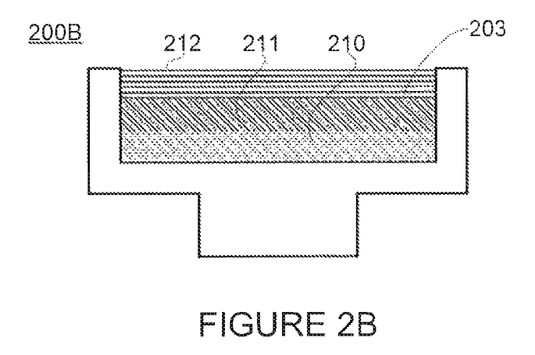
FIG. 2B illustrates a cross section of a multi-component optical system blank mold having a second, third, and fourth optical component in the cavity of the mold.

In various embodiments, a multi-component optical system blank mold may comprise additional components within the cavity of the cup portion of the mold. In various embodiments and with reference to FIG. 2A, mold 200A may comprise a second optical component 210 contained in cavity 203. Similarly, in various embodiments, a mold may comprise additional optical components, and may comprise up to an nth optical component. By way of illustration, in FIG. 2B, mold 200B contains a second optical component 210, a third optical component 211, and a fourth optical component 212 in cavity 203.

Figure 2C:
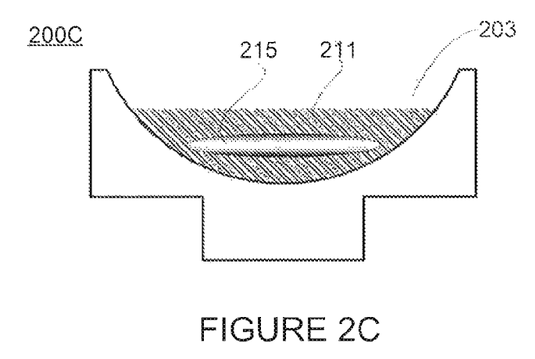
FIG. 2C illustrates a cross section of a multi-component optical system blank mold having a preformed optical element as a second optical component embedded in a third optical component.

As used herein, the term "optical component" means any type of optical material, as that term has been defined supra, or a "preformed optical element," which term includes, for example, polarization filters, refractive lenslets, diffractive lenslets, selective chromatic filters, bandpass filters, circular polarizing filters, linear polarizer filters, gray attenuator filters, birefringent filters, zone plates, mirrors, electronic circuits, electronic devices, microdisplays, sensors, antennas, or nanowires. In accordance with various embodiments, a multi-component optical system blank mold may comprise a composite of an optical material and a preformed optical element. By way of example, and as illustrated in FIG. 2C, multi-component optical system blank mold 200C may comprise a mold having a preformed optical element 215, such as, for example, a lenslet, as a second optical component. Preformed optical element 215 may be encapsulated in a third optical component 211 in cavity 203. As used in this disclosure, the term preformed optical element may also include an element or device that itself comprises a composite or multi-component device, for example, a sensor embedded in a lenslet or a lenslet that also comprises a filter.

In various embodiments and as illustrated in FIGS. 3A-3D, multi-component optical system blank molds can comprise a cup portion 301 having multiple compartments or additional cavities within cavity 303. For example, the inner wall of the cup portion may comprise protrusions or walls 306 that are substantially coaxial and define a second cavity 307 and a third cavity 308 within cavity 303 of the cup portion, as illustrated for molds 300A and 300B in FIGS. 3A-3B. The surfaces of the protrusions or walls defining additional cavities may be parallel to the axis of the mold, or they may define an angle with respect to the axis of the mold. In other embodiments, the surfaces of the protrusions or walls may define curves, angles, or other non-linear forms in an axial dimension.

Figure 3A:
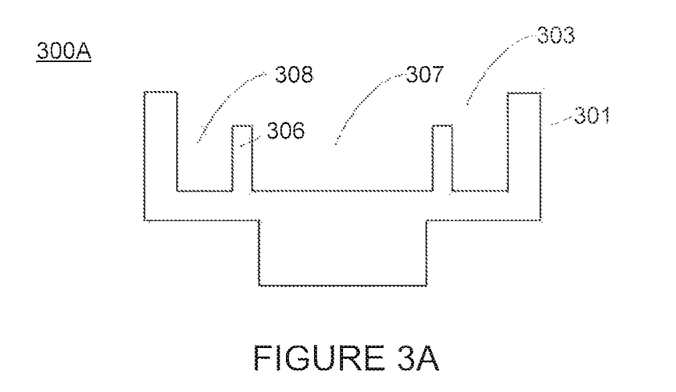
FIG. 3A illustrates a cross section of a multi-component optical system blank mold having an inner wall with a second axial wall defining second and third cavities within the first cavity of the mold.
Figure 3B:
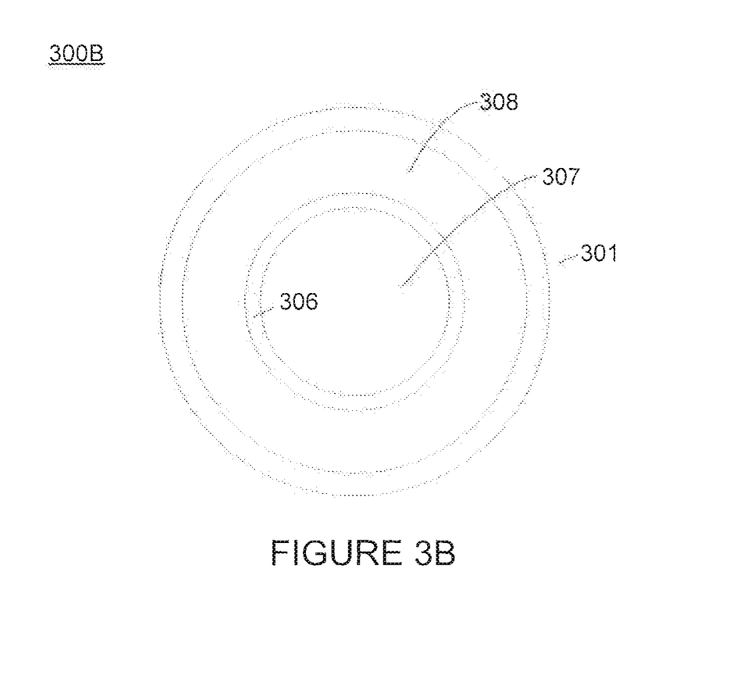
FIG. 3B illustrates a top view of a multi-component optical system blank mold having an inner wall with a second axial wall defining second and third cavities within the first cavity of the mold.
Figure 3C:
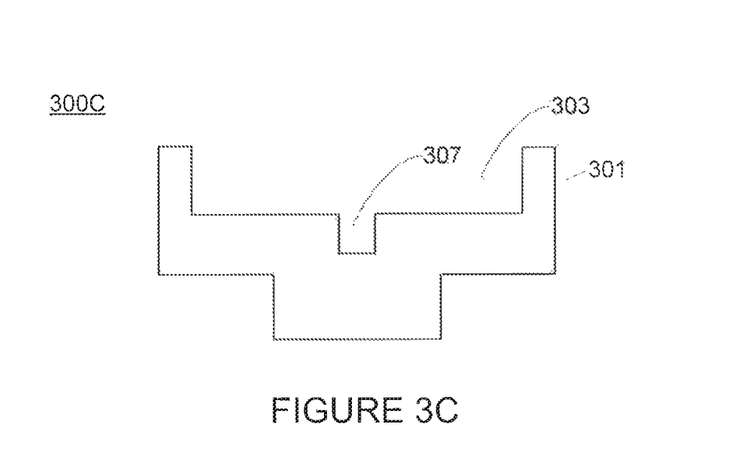
FIG. 3C illustrates a cross section of a multi-component optical system blank mold having an inner wall that is recessed with respect to the bottom surface of the inner wall at the axis of the mold.
Figure 3D:
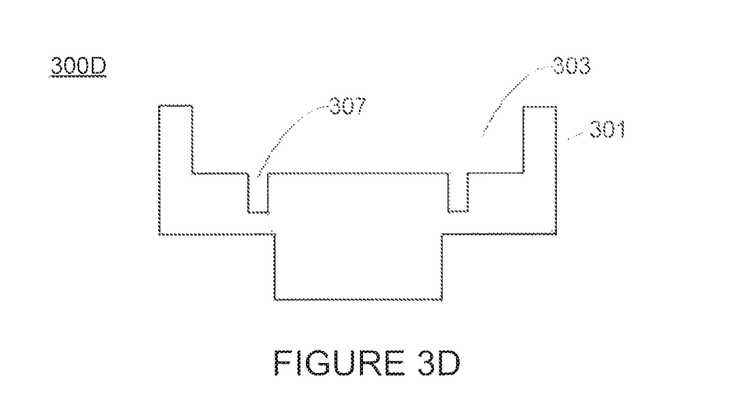
FIG. 3D illustrates a cross section of a multi-component optical system blank mold having an inner wall that is recessed with respect to the bottom surface of the inner wall at a distance from the axis of the mold.

Similarly, in other embodiments and as illustrated for molds 300C and 300D shown in FIGS. 3C-3D, the bottom surface of the inner wall may have a region wherein the inner wall is recessed with respect to a substantial portion of the remainder of the bottom surface of the inner wall, thereby forming a second cavity 307. This second cavity 307 may be at the axis of the mold, as illustrated for mold 300C in FIG. 3C (as well as molds 300A and 300B, shown in FIGS. 3A-3B), or may be at some distance from the axis, essentially forming a channel defined by walls that are substantially coaxial, as illustrated for mold 300D in FIG. 3D, although the walls may also define curves, angles, or other non-linear forms. Likewise, in various embodiments, a mold having a cavity 303 defined by a concave inner wall may also have protruding or recessed portions or regions that similarly define additional cavities within cavity 303 of the cup portion. In various embodiments, the additional cavities may be symmetrical and/or centered with respect to the axis of the mold, while in other embodiments, the additional cavities may be asymmetrical and/or off-center.

Figure 4:
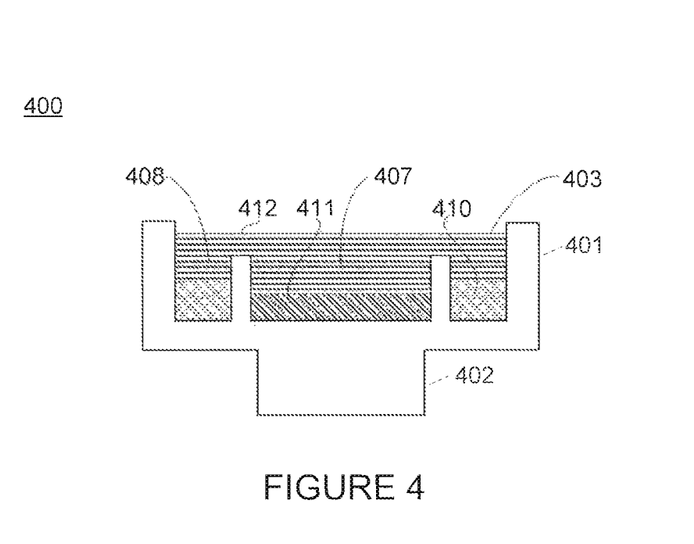
FIG. 4 illustrates a cross section of a multi-component optical system blank mold having an inner wall with a second axial wall defining second and third cavities within the first cavity of the mold and having additional optical components in the second and third cavities of the mold.
Figure 5A:
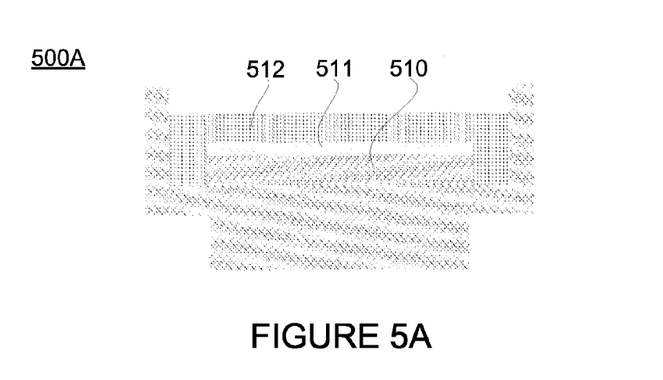
FIG. 5A illustrates a cross section of a multi-component optical system blank mold having a second, third, and fourth optical component in the cavity of the mold, with the fourth optical component located in the first cavity as well as in a second cavity formed in the second and third components.
Figure 5B:
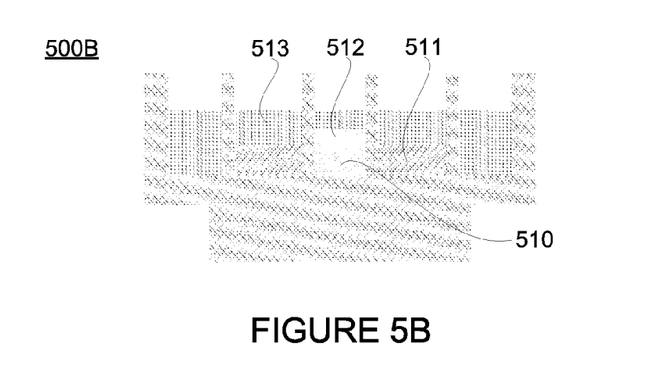
FIG. 5B illustrates a cross section of a multi-component optical system blank mold having a second, third, and fourth cavity located in the first cavity of the mold, with second, third, fourth, and fifth optical components variously located in the cavities of the mold.
Figure 5C:
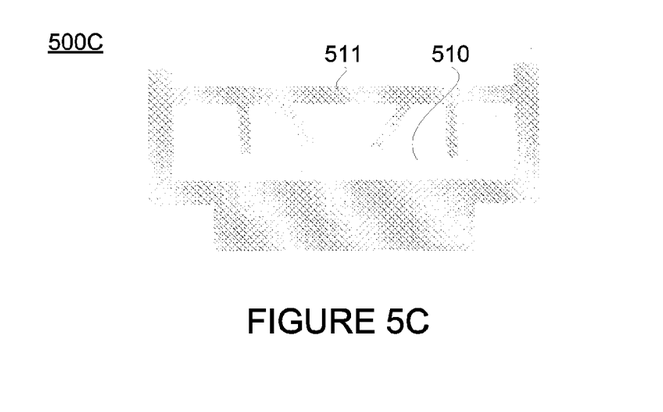
FIG. 5C illustrates a cross section of a multi-component optical system blank mold having a second and third cavity formed in a second optical component, as well as a third optical component in the first, second, and third cavities of the mold.
Figure 5D:
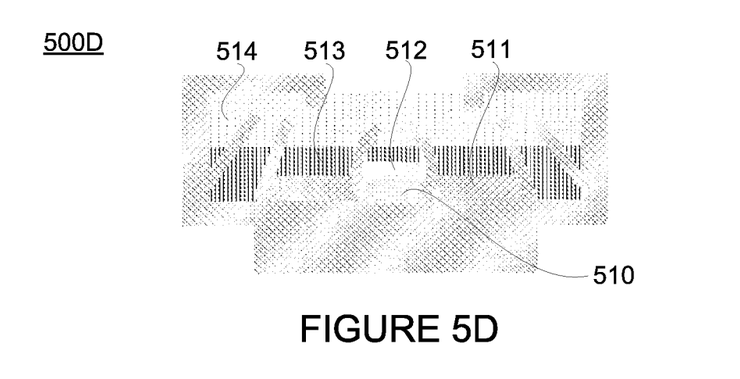
FIG. 5D illustrates a cross section of a multi-component optical system blank mold having a plurality of additional cavities and optical components in the cavity of the mold.
Figure 5E:
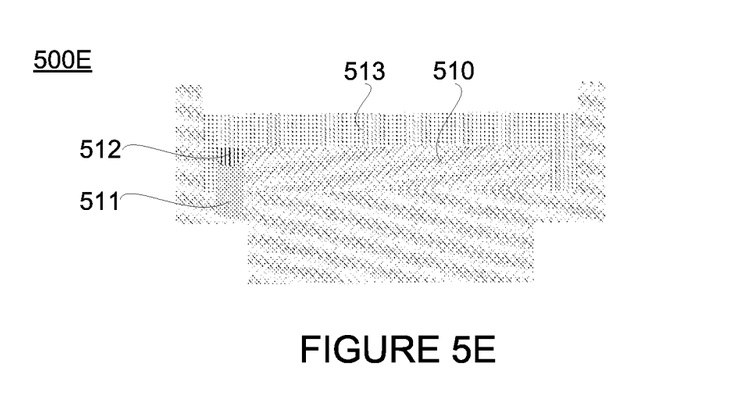
FIG. 5E illustrates a cross section of a multi-component optical system blank mold having a second, third, fourth, and fifth optical component in the cavity of the mold, with the second and third optical components located asymmetrically and off-center with respect to the axis of the mold.

In various embodiments and as previously described with respect to FIGS. 3A-3D, additional compartments or cavities may be present with respect to the inner wall of the mold cavity for a mold comprising one or more optical components. FIG. 4 illustrates a mold comprising multiple cavities and multiple components. As shown in FIG. 4, mold 400 comprises first cavity 403 as well as second cavity 407 and third cavity 408. Mold 400 comprises cup portion 401 and attachment portion 402 made from a first optical component. In various embodiments, second cavity 407 may be partially filled with a second optical component 410, and third cavity 408 may be partially filled with a third optical component 411, as illustrated in FIG. 4. The first cavity 403 may be further filled or partially filled with a fourth optical component 412, which may additionally fill or partially fill second cavity 407 and third cavity 408. In general, in embodiments having multiple mold cavities, each cavity may contain different or separate optical components. For example, a second mold cavity may contain a different optical component from a third mold cavity, or a second mold cavity may contain multiple optical components, while a third mold cavity may contain a single optical component.

Although the second and third cavities of the mold shown in FIGS. 3A-4 are illustrated as formed in or from the first optical component, in various embodiments, additional cavities may be formed after addition of second, third, or nth optical components to the first cavity of a mold, for example, by machining a cavity into or through layers of optical components in the first cavity of the mold. As will be recognized from the present disclosure, a mold having any number of possible permutations of number, form, and/or configuration of additional cavities, which may further contain any number of possible permutations of optical components, is within the scope of the present disclosure.

Furthermore, although not illustrated, a mold comprising more than one cavity may also comprise a preformed optical element within one of the cavities of the mold. Similarly, a mold in accordance with various embodiments may not be comprised entirely of solid materials but may comprise voids or spaces such as might be created by unfilled cavities or portions of a cavity within a mold. For example, an optical component added as a preformed optical element may be added in such a manner as to occlude a cavity such as a second cavity formed within the cavity of the cup portion of mold, thus preventing optical components subsequently added as an unpolymerized liquid from filling the occluded cavity and creating a void in the mold. In other embodiments, a preformed optical element may comprise a void and so create a void in a mold comprising the preformed optical element. A void in a mold created in any manner is within the scope of the present disclosure.

By way of example and as shown in FIGS. 5A-5E, molds 500A-500E illustrate various embodiments comprising a variety of configurations of cavities and additional optical components, variously having a second optical component 510, third optical component 511, fourth optical component 512, fifth optical component 513, and sixth optical component 514. The embodiments shown are for purposes of illustrating a range of possible configurations of cavities and components only, and not for purposes of limitation.

Figure 6A:
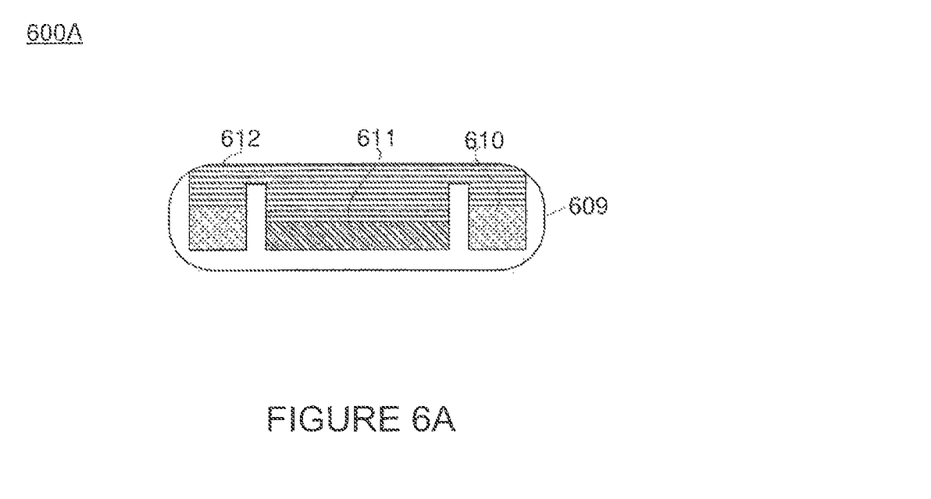
FIG. 6A illustrates a cross section of a multi-component optical system blank or button formed from a blank mold such as that illustrated in FIG. 4.

In various embodiments, a multi-component optical system blank comprises at least a first optical component and a second optical component. FIG. 6A illustrates an example of an embodiment of a multi-component optical system blank such as might be derived from a mold illustrated in FIG. 4 having multiple cavities within the first cavity of the mold and having additional optical components in the cavities of the mold. In accordance with various embodiments and as illustrated in FIG. 6A, multi-component optical system blank 600A comprises first optical component 609. Blank 600A further comprises at least a second optical component 610, and may comprise nth additional optical components, such as the third optical component 611 and fourth optical component 612 shown for purposes of illustration in FIG. 6A. As illustrated, the first optical component 609 of blank 600A may comprise a cup portion having a cavity in which the additional components are located. In various other embodiments, the first optical component 609 may not comprise a cup portion having a cavity, and additional components comprise layers associated with a layer of first optical component 609. The configurations of the various components of the multi-component optical system blank may have any of a number of permutations of shapes or forms previously described above with regard to the optical system blank molds illustrated in FIGS. 1-5E that might be used to fabricate a blank such as that illustrated in FIG. 6A. In various embodiments, blank 600A may be formed from such molds by processes described below in greater detail.

In accordance with further aspects, blank 600A may have an attachment portion to facilitate further shaping or machining of the blank into a lens or optical system, or blank 600A may comprise a "button," such as that illustrated in FIG. 6A. The blank or button may have any shape suitable for further processing into an optical lens or other optical system, such as that discussed below.

Figure 6B:
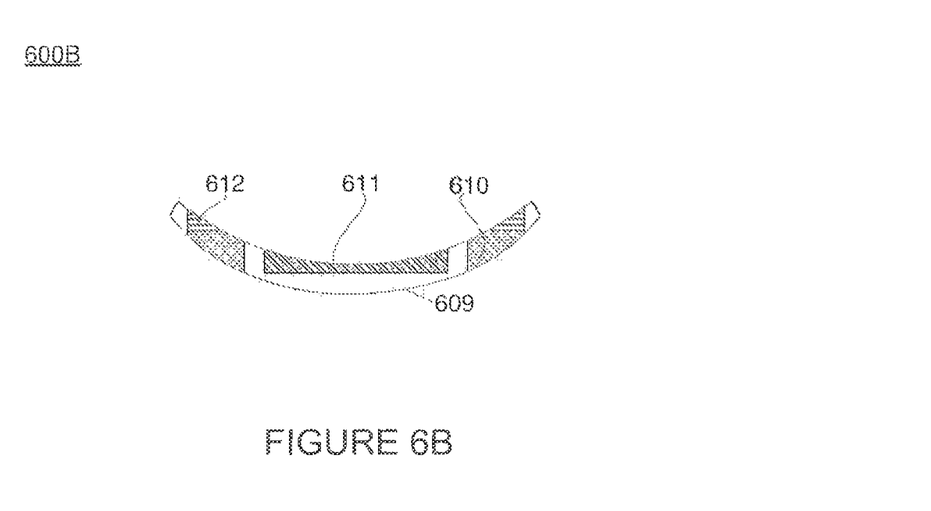
FIG. 6B illustrates a cross section of a multi-component optical system formed from a blank such as that illustrated in FIG. 6A.

In various embodiments, a multi-component optical system comprising at least two optical components having differing properties is provided. A multi-component optical system in accordance with various embodiments and such as might be derived from blank 600A is illustrated in FIG. 6B. As described above with reference to blank 600A from which it may be derived by further manufacturing, multi-component optical system 600B comprises first optical component 609, second optical component 610, third optical component 611, and fourth optical component 612. As described previously, the multi-component optical system may comprise first optical component 609 that served as a mold for additional optical components during manufacture of the blank. The arrangement and locations of second optical component 610, third optical component 611, and fourth optical component 612 may be accurately predetermined in relation to each other, first optical component 609, and their final location and conformation in multi-component optical system 600B due to the advantages of using the integral mold provided in the present disclosure.

In various embodiments, a process for fabricating a multi-component optical system blank comprises providing an integral optical system blank mold comprising a first optical component, adding at least a second optical component, and, optionally, shaping the cavity of the blank mold, adding additional optical components, and/or shaping the blank into an optical system or an optical system blank, button, or other optical system precursor.

Figure 7:
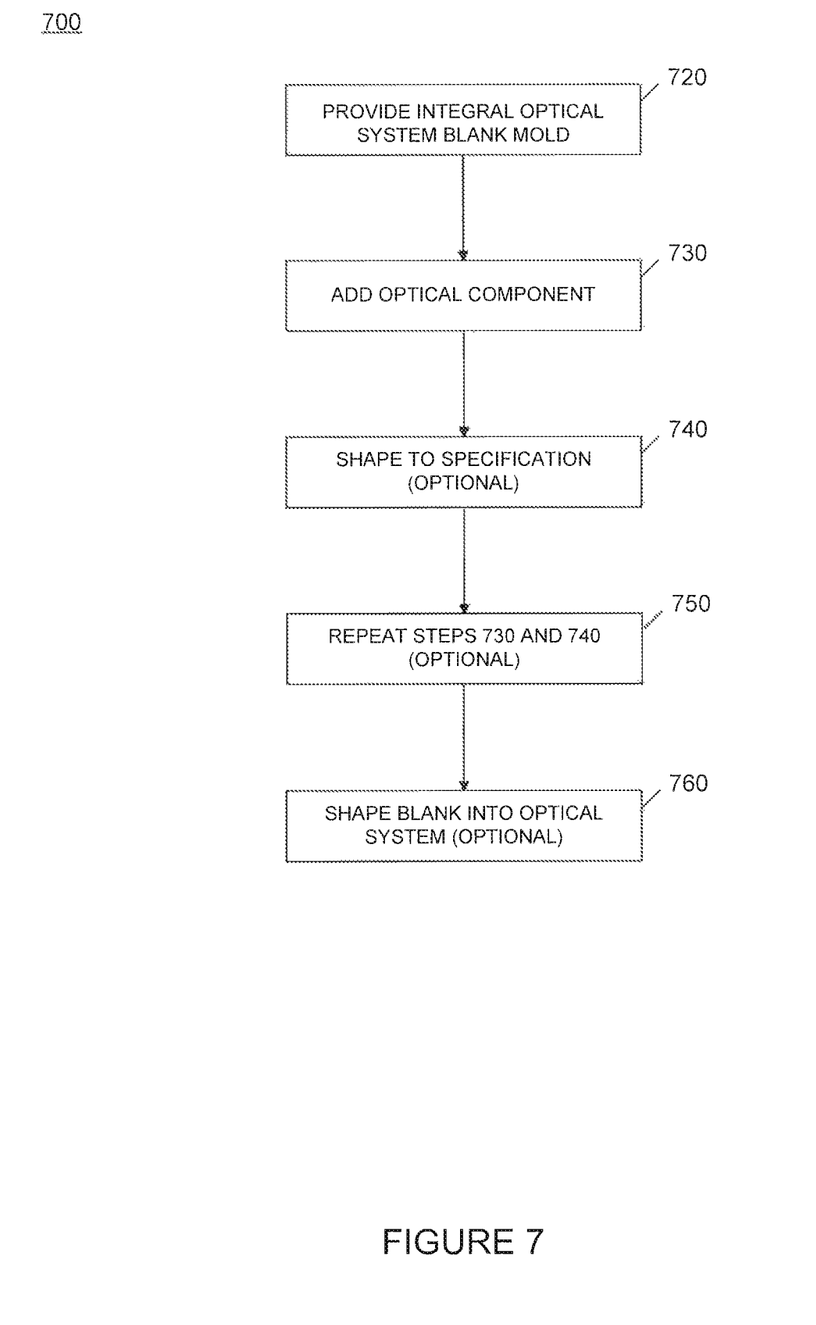
FIG. 7 illustrates a process for fabricating a multi-component optical system blank.

FIG. 7 illustrates a multi-component optical system fabrication process 700 for manufacturing a multi-component optical system. In various embodiments, multi-component optical system fabrication process 700 includes the steps of provide integral optical system blank mold step 720, add optical component(s) step 730, optional shape to specification step 740, optional repeat steps 730 and 740 step 750, and optional shape blank into optical system step 760.

In accordance with various embodiments, provide integral optical system blank mold step 720 may comprise shaping or forming a mold. The mold may be shaped or formed from a first optical material. In various embodiments, the mold may be shaped from a blank or button comprising a first optical material, for example, by machining on a lathe, laser milling, or other material removal methods. Alternatively, the mold may be formed from a first optical material by processes, such as, for example, cast molding, injection molding, or spin casting. In various embodiments, a mold may be provided or manufactured by a combination of methods, for example, molding and machining.

After an optical system blank mold has been prepared or is otherwise provided for use in the multi-component optical system blank fabrication process, a second optical system blank component may be added in the add optical component(s) step 730. In various embodiments, process 700 may comprise adding unpolymerized optical materials in the add optical component(s) step 730, and/or the process may comprise adding preformed optical elements in the add optical component(s) step 730. In accordance with various embodiments, add optical component(s) step 730 does not comprise adding a second optical component to an anterior or convex curve of an optical system blank mold.

In accordance with various embodiments, the second optical component may be an unpolymerized monomer of an optical material. In various embodiments, and with reference back to FIGS. 1A-1B, second optical component may be added to the cavity 103 of the cup portion as an unpolymerized liquid. The second optical component may be polymerized within cavity 103 and bonded to the mold comprising a first optical component without additional adhesive layers, and the cure shrinkage of the second optical material may be controlled so that it proceeds from the top down to the bottom since the monomer to be polymerized can be added such that it fills the cavity of the mold or is added in excess by overfilling the cavity of the mold. Excess second optical material may be removed by physical processing later, as described in more detail below.

In other embodiments, the second optical component may be added such that it does not fill the cavity of the cup portion of the mold, but only partially fills the cavity. In such an embodiment, the second optical material may still be present in excess such that an additional shaping step, for example, a machining step, is required to conform the dimensions of the second optical material to specification. In yet other embodiments, the second optical component may be added and cured in such a manner that the second optical material in its polymerized state in the cavity of the mold requires no additional shaping or machining. For example, the second optical component may be added as a uniform layer, or, the second optical component may be added and formed during polymerization by addition of a second mold within the cavity of the cup portion of the integral optical system blank mold. The second mold may or may not comprise an additional optical material and may or may not be removed following polymerization of the second optical material.

In other embodiments, the second optical component added to the blank mold in the add optical component(s) step 730 may be a preformed optical element described above in relation to FIG. 2C. The preformed optical element may be suspended on or mounted to the inner wall of the cavity of the mold by a suspending element, wherein the suspending element suspends the preformed optical element at a predetermined distance from the inner wall of the mold cavity or from a reference surface of the mold. In various embodiments, the suspending element comprises a soft or rigid polymerized material that has an index of refraction approximately equal to that of a polymerizable liquid that is used to encapsulate the preformed optical element in the cavity of the mold after the polymerizable liquid has cured. For other such embodiments, the preformed optical element may be suspended or mounted off-center with respect to the axis or a geometric center of the multi-component optical system blank mold and any subsequent multi-component optical system that might be formed thereby. In various other embodiments, the preformed optical element may comprise a third, fourth, or nth optical component.

In various embodiments, the preformed optical element may be fully encapsulated in the cavity of the mold by a single additional optical component added in a later step of the fabrication process. For example, in an embodiment wherein a preformed optical element is added to the cavity of a mold as the second optical component, a third optical component may be added to the cavity of the mold as a polymerizable liquid to a level that fills or partially fills the cavity of the mold above the level of the preformed optical element, such that when the third optical component has polymerized, the preformed optical element is encapsulated by or embedded within the third optical component. In various other embodiments, the preformed optical element may be encapsulated in the cavity of the mold by addition of two or more optical components. For example, in an embodiment wherein a preformed optical element is added to the cavity of a mold as the second optical component, a third optical component may be added to a level that partially fills the cavity of the mold to a level that partially encapsulates the preformed optical element. After polymerization, a fourth and/or additional optical components may be added to the cavity to partially fill or fill the cavity of the mold to a level that encapsulates the preformed optical element within the cavity of the mold.

In various embodiments, an optical component may be added in the add optical component(s) step 730 in a manner that creates or leaves a void or space between the optical component and any one or more of the previously present or added components. Alternatively, a preformed optical element may be added that includes a void within the preformed optical element. Expressed another way, a multi-component optical system in accordance with the present disclosure may comprise voids within or between optical components and need not be entirely comprised of solid material. For example, a preformed optical element may be placed in the cavity of the cup portion of a mold in such a manner as to occlude the opening to a second cavity that has not been filled with an optical component and prevent later added optical components from filling the cavity, thus creating a void in the mold. Any manner of addition of an optical component in the add optical component(s) step 730 that results in the creation of a void in the multi-component optical system produced in process 700 is within the scope of the present disclosure.

In various embodiments, the add optical component(s) step 730 may comprise addition of a preformed optical element comprising more than one optical component. For example, a preformed optical element may comprise a lenslet formed using a polymerizable liquid monomer comprising a second optical component that is attached to a filter assembly comprising a third optical component, thereby forming a multi-component preformed optical element. This multi-component preformed optical element may be added to the multi-component blank in the add optical component(s) step 730 as a second and third optical component in the manner described above.

Following addition of an optical component to the blank mold in the add optical component(s) step 730, the inner wall of the mold may be shaped to specification in an optional shape to specification step 740. In various embodiments, the added optical component may be shaped to specification by molding. For example, in an embodiment wherein the added optical component comprises an unpolymerized monomer of an optical material, the monomer may be shaped during polymerization by placing a second, removable mold in contact with the unpolymerized monomer within the cavity of the cup portion of the mold to shape the surface of the second optical material within the cavity of the mold. In such an embodiment, the second mold may be removed after polymerization of the second optical material. The added optical component may or may not be further shaped after polymerization and removal of the mold using a material removal step, as described below.

In other embodiments, the optional shape to specification step 740 may comprise, for example, a milling or other material removal step. In various embodiments, an excess volume of an unpolymerized monomer of an optical material may be added within the cavity of the mold. The optical material is cured or polymerized to form an additional optical component of the multi-component blank. Excess optical material, may be removed and the inner wall of the cavity shaped to specification by any of a variety of techniques, for example, lathing or milling. The inner wall of the cavity may be shaped to specification with respect to various control features of the mold, for example, a reference surface or surfaces and/or a central axis against which the depth and location of features of the blank may be determined, such that the positions of the optical components may be predetermined in relation to each other and in relation to a finished multi-component optical system.

In various embodiments of a process for fabricating a multi-component optical system blank and with continued reference to FIG. 7, add optical component(s) step 730 and optional shape to specification step 740 may be repeated any number of times in optional step 750. In various embodiments, as optical components are added in the blank fabrication process, the inner wall of the cavity may comprise portions of the first optical component (i.e., the multi-component optical system blank mold) as well as portions of the additional optical components, for example, the second, third, or nth optical components. As described above with reference to FIGS. 3A-3D, the inner wall of the cavity may be shaped or machined to comprise additional cavities within the first cavity of the cup portion of the mold. This may be accomplished by, for example, machining a depression or recessed portion in a bottom surface of the inner wall of the cavity to form a second cavity within the first cavity. In various embodiments, such a second cavity may be formed, for example, at an axis of the mold, or at a distance from the axis of the mold to form a coaxial channel. In other embodiments, a second cavity may be formed that is off center with respect to the axis of the mold. In still other embodiments, a number of additional cavities, including, for example, second, third, and nth cavities may be formed in the inner wall of the first cavity of the mold. The additional cavities may be of any of a variety of shapes, depths, volumes, or configurations. For example, the additional cavities may have walls that are axial, or walls that are angled, curved, or non-linear with respect to the axis of the mold. Although illustrated in FIGS. 3A-3D with respect to a mold comprising a first optical component, the basic configurations of additional cavities represented may be fabricated by material removal in the shape to specification step 740 after addition of any number of optical components to the mold. As described above and as illustrated in FIGS. 5A, 5C, and 5E, the added optical components may be molded or shaped to comprise additional cavities within the primary cavity of the cup portion of the mold.

In various embodiments, after polymerization in the case of addition of unpolymerized monomers, and either before or after optional shaping, a surface of the second, third, or nth optical material may comprise an inner wall of the cavity. In such embodiments, the original cavity of the cup portion of the mold may be altered by the addition of the second, third, and nth optical components, and a new or modified cavity defined by an inner wall comprising a surface of the cup portion and/or a surface of the second, third, or nth optical component. For example, after addition and polymerization of the second optical component and any subsequent shaping steps, a surface of the second optical component may comprise all or a portion of the inner wall of the cavity of the cup portion. In various embodiments, the cup portion has a bottom wall, an axial wall, and a cup portion defined by an inner wall having a bottom surface substantially parallel to the bottom wall and a first axial surface substantially parallel to the axial wall. In various embodiments, the second optical component may form a layer having an upper surface substantially parallel to the bottom wall (e.g., the upper surface of the layer formed by the second optical component may be substantially orthogonal to the axis of the mold), and the upper surface of the second optical component may contribute to defining the altered cavity and comprise the bottom surface of the cavity. Expressed another way, the cavity of the cup portion of the mold may be changed in volume and conformation upon addition of each new component of a multi-component optical system blank, with each additional optical component defining or contributing to the definition of the cavity of the cup portion of the mold.

The surfaces of the cavity that will comprise the interface with the additional optical component layers may be shaped or machined to have different configurations, curves and dimensions, depending on the application, using any of the various methods previously described. Furthermore, the effect of dimensional changes that may occur during curing or polymerization of an added optical component, for example, an optical material as described above that is added in an unpolymerized form, may be thereby eliminated without negatively affecting the optical performance of the optical system produced. A reference surface or surfaces and/or an axis of the cylindrical section facilitates the accurate determination of the location of the position of such interfaces such that the positions and configurations of the optical components may be predetermined in relation to each other and in relation to a finished multi-component optical system.

In various embodiments, a process for fabricating a multi-component optical system blank comprises an optional shape blank into optical system step 760. In various embodiments, a multi-component optical system blank or button produced by process 700 that contains at least two optical components may be shaped into a contact lens, for example, a hybrid or scleral contact lens. The optical components may have different optical properties. In various embodiments, the blank and the lens produced therefrom has at least one optical component that may be curved. The lens may comprise preformed optical elements, for example, apertures or filters, encapsulated in optical material of the lens. In accordance with various embodiments, the blank fabricated as disclosed herein is not a bifocal lens blank. The blank may be rigid and may be made of a material suitable for lathing or milling during process 700 to facilitate shaping the blank into a finished optical system in optional shape blank into optical system step 760. In accordance with various embodiments, the blank produced during process 700 may comprise certain reference or control surfaces and/or axes that facilitate accurate shaping, milling, or machining in optional shape blank into optical system step 760 such that the optical components of the blank may be accurately located in predetermined positions in the resultant multi-component optical system.

The term integral as used in this disclosure means that the element described or characterized using this term is incorporated in or is a constituent part of the final optical system blank or optical system subsequently produced from the blank.

The term optical system as used in the description includes any device that has optical components, as herein defined, and is in contact with the ocular tissue. This includes, for example, any hybrid, gas permeable, soft, hard, corneal, or scleral contact lens, and any intra-corneal or intra-ocular device. Though various embodiments may be described in terms of a contact lens, one of ordinary skill in the art will appreciate after reading the disclosure that any of the optical systems described above could be used in place of a contact lens without deviating from the scope or principles of the present disclosure.

The term filter includes apparatus for selectively transmitting electromagnetic radiation.

It is believed that the disclosure set forth above encompasses at least one distinct invention with independent utility. While various embodiments have been disclosed, the specific embodiments thereof as disclosed and illustrated herein are not to be considered in a limiting sense as numerous variations are possible. The subject matter of the disclosure includes all novel and non-obvious combinations and sub combinations of the various elements, features, functions and/or properties disclosed herein and their equivalents.

The devices and processes described herein may be used to manufacture multi-component optical systems having improved quality and features. Other advantages and features of the present devices and processes may be appreciated from the disclosure herein and the implementation of the devices and processes.

What is claimed is:

1. A mold for fabricating a multi-component optical system blank comprising:
   a cup portion, wherein the cup portion comprises an inner wall and a first cavity defined by the inner wall; and
   a machine attachment portion;
   wherein the cup portion comprises a first optical component, and
   wherein the blank comprises a portion of the cup portion.

2. The mold of claim 1, further comprising a reference surface.

3. The mold of claim 1, wherein the cup portion further comprises a bottom wall and a first axial wall.

4. The mold of claim 3, wherein the inner wall is concave.

5. The mold of claim 3, the inner wall further comprising a first bottom surface and a first axial surface.

6. The mold of claim 1, wherein the first cavity contains a second optical component.

7. The mold of claim 6, wherein the first cavity contains more than two optical components.

8. The mold of claim 7, wherein at least one optical component is selected from a group consisting of polarization filters, refractive lenslets, diffractive lenslets, selective chromatic filters, bandpass filters, circular polarizing filters, linear polarizer filters, gray attenuator filters, birefringent filters, zone plates, mirrors, electronic circuits, electronic devices, microdisplays, sensors, antennas, and nanowires.

9. The mold of claim 8, wherein the inner wall is shaped to specification.

10. The mold of claim 9, wherein the first cavity further comprises:
    a second cavity defined by a second axial wall and a second bottom surface within the first cavity, and
    a third cavity defined by the second axial wall and a third bottom surface within the first cavity.

11. The mold of claim 9, wherein the first cavity further comprises a second cavity defined by a second axial surface and a second bottom surface within the first cavity.

12. The mold of claim 9, wherein the first cavity further comprises a second cavity defined by a second axial surface, a third axial surface, and a second bottom surface within the first cavity.

13. The mold of claim 10, wherein the second cavity and the third cavity contain separate optical components.

14. The mold of claim 1, wherein the machine attachment portion is configured for fastening in a collet and comprises a reference surface.

* * * * *